(12) United States Patent
Qi et al.

(10) Patent No.: US 8,867,124 B2
(45) Date of Patent: Oct. 21, 2014

(54) RELAY STATION AND METHOD FOR ADJUSTING OUTPUT OPTICAL SIGNALS OF THE RELAY STATION

(75) Inventors: Juan Qi, Munich (DE); Xiaozhong Shi, Chongdu (CN); Sen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 13/338,436

(22) Filed: Dec. 28, 2011

(65) Prior Publication Data

US 2012/0093522 A1 Apr. 19, 2012

Related U.S. Application Data

(63) Continuation of application No. PCT/CN2010/076718, filed on Sep. 8, 2010.

(30) Foreign Application Priority Data

Sep. 11, 2009 (CN) .......................... 2009 1 0092938

(51) Int. Cl.
*H01S 3/09* (2006.01)
(52) U.S. Cl.
USPC ............... 359/337.11; 359/341.41; 359/341.2
(58) Field of Classification Search
USPC .............................. 359/337.11, 341.41, 341.2
See application file for complete search history.

(56) References Cited

U.S. PATENT DOCUMENTS

| 5,274,496 A | 12/1993 | Fujiwara et al. |
| 7,119,949 B1 | 10/2006 | Talmadge et al. |
| 2002/0076182 A1 | 6/2002 | Terahara et al. |
| 2005/0100343 A1 | 5/2005 | Yoshida |
| 2005/0286898 A1 | 12/2005 | Okuno |

(Continued)

FOREIGN PATENT DOCUMENTS

| CN | 1351428 A | 5/2002 |
| CN | 1614910 A | 5/2005 |

(Continued)

OTHER PUBLICATIONS

EPO Extended European Search Report dated Jul. 17, 2012, issued in related European Application No. 10814991.5, Huawei Technologies Co., Ltd. (5 pages).

(Continued)

*Primary Examiner* — Mark Hellner
(74) *Attorney, Agent, or Firm* — Leydig, Voit & Mayer, Ltd.

(57) ABSTRACT

Embodiments of the present invention relate to a relay station and a method for adjusting output optical signals of the relay station. The relay station includes: a detection control unit, an output light stabilization unit, a reply stabilization unit, an adjustable gain amplification unit, and a pump light output unit. The method for adjusting output the optical signals of the relay station includes: adjusting a drive current which drives generation of pump light; adjusting a pilot tone modulation depth of an Alternating Current (AC) signal on which a replay signal is modulated; and finally, outputting a stable output optical signal through disturbed pump light. Adjusting the output optical signals and the pilot tone modulation depth of the AC signal on which the replay signal is modulated, the reply signals are stably output, thereby achieving the purpose of fixing the pilot tone modulation depth.

15 Claims, 4 Drawing Sheets

(56) References Cited

U.S. PATENT DOCUMENTS

2009/0207484 A1    8/2009   Shia et al.
2009/0316255 A1*   12/2009   Ramakrishnan et al. ..... 359/337
2010/0157415 A1*   6/2010   Okrog ........................... 359/333

FOREIGN PATENT DOCUMENTS

| | | | |
|---|---|---|---|
| CN | 101453273 | A | 6/2009 |
| EP | 0973276 | A2 | 1/2000 |
| EP | 1973246 | A1 | 9/2008 |
| JP | 05199184 | A | 8/1993 |
| JP | 05211482 | A | 8/1993 |
| JP | 06152538 | A | 5/1994 |
| JP | 07273727 | A | 10/1995 |
| JP | 08265259 | A | 10/1996 |
| JP | 11344732 | A | 12/1999 |
| JP | 2000031916 | A | 1/2000 |
| JP | 2006060764 | A | 3/2006 |
| WO | WO 2004/012364 | A1 | 2/2004 |

OTHER PUBLICATIONS

Written Opinion of the International Searching Authority in International Application No. PCT/CN2010/076718 mailed Dec. 16, 2010.

English-language International Search Report in International Application No. PCT/CN2010/076718 mailed Dec. 16, 2010.

Search Report in corresponding Chinese Patent Application No. 200910092938.X (Feb. 16, 2013).

1st Office Action in corresponding Japanese Patent Application No. 2012-519878 (May 30, 2013).

* cited by examiner

RELAY STATION AND METHOD FOR ADJUSTING OUTPUT OPTICAL SIGNALS OF THE RELAY STATION

CROSS-REFERENCE TO RELATED APPLICATIONS

This application is a continuation of International Application No. PCT/CN2010/076718, filed on Sep. 8, 2010, which claims priority to Chinese Patent Application No. 200910092938. X, filed on Sep. 11, 2009, both of which are hereby incorporated by reference in their entireties.

FIELD OF THE INVENTION

The present invention relates to the field of communications technologies, and more particularly, to a relay station and a method for adjusting output optical signals of the relay station.

BACKGROUND OF THE INVENTION

Presently, in the field of submarine optical communications, a Command & Response (C&R) monitoring system is generally used to monitor submarine transmission equipment such as a relay station (repeater) and a branch unit. The C&R monitoring system adopts the working mode of direct communication, in which terrestrial equipment sends a monitoring signal to submarine transmission equipment to be monitored, and the submarine transmission equipment feeds back a reply signal of working conditions and various parameters in the current state after receiving the command or at a predetermined trigger condition.

In the prior art, the method for modulating information sent by the C&R monitoring system includes: modulating a sub-carrier scramble signal with a smaller pilot tone modulation depth on a main optical signal transmitted on a main optical channel, and performing Amplitude Shift Keying (ASK) modulation on the sub-carrier scramble signal, so as to carry a monitoring signal or a reply signal. The pilot tone modulation refers to superpose a low-frequency sinusoidal signal with small amplitude on an optical signal transmitted by a transmitter to serve as an identifier; and detect sinusoidal signals of various frequencies to identify power levels of corresponding optical signals through the identifier at relay stations, so as to extract desired information. The pilot tone modulation depth of the scramble signal is generally smaller than 10% of the amplitude value of the main optical signal transmitted on the main optical channel, so that the transmission of normal services is not influenced.

The relay station in a submarine optical communication system generally adopts the Automatic Level Control (ALC) mode, so that the output optical power of the main optical signal transmitted on the main optical channel can be maintained at a fixed level. The scramble signal may be modulated on pump light of an Erbium Doped Fiber Amplifier (EDFA), so as to modulate the scramble signal on the main optical signal transmitted. However, if the output optical power input to the relay station changes or the ambient temperature changes (output of a laser is influenced by the ambient temperature), and the strength of the scramble signal is not adjusted, the pilot tone modulation depth of the scramble signal modulated on the pump light changes, which results in that the pilot tone modulation depth of the scramble signal on the main optical channel changes with the change of the input optical power. Excessive large pilot tone modulation interferes main optical signals actually transmitted on the main optical channel, and excessive small pilot tone modulation depth influences information transmission of the C&R monitoring system.

In the prior art, a method for fixing a pilot tone modulation depth is adopted, in which according to the strength of a pump current, the amplitude of a scramble signal is adjusted, so that a ratio of the amplitude of the scramble signal to the amplitude of the pump current is constant, thereby achieving the purpose of fixing the pilot tone modulation depth of the scramble signal on a main optical channel. FIG. 1 is a schematic structural diagram of a relay station with a fixed pilot tone modulation depth in the prior art. As shown in FIG. 1, the relay station includes an uplink control part 10 and a downlink control part 10', in which components of corresponding numerals included in the uplink control part 10 and the downlink control part 10' are the same component in the relay station, for example, an adjustable gain amplifier 107 and an adjustable gain amplifier 107'.

In view of the uplink control part 10, an optical signal, including a main optical signal and a monitoring signal modulated on the main optical signal, enters an erbium doped fiber 101 from a transmission link 100; pump light generated by a pump Laser Diode (LD) 106 is reflected into the erbium doped fiber 101 by a coupler 102, and the incident optical signal is amplified; most of the amplified optical signal is continuously transmitted on the transmission link 100 when passing through an optical splitter 103, and the rest small part of optical signal enters a photodiode (PD) 104 and is converted to a current signal, in which this part of current signal serves as a feedback, and is finally used to adjust the pump light output by the LD 106, so as to compensate the optical signal output by the coupler 102. A Direct Current (DC) signal of the current signal partially enters an output light stabilization circuit 105, the output light stabilization circuit 105 compares the current value of the DC signal with a preset value and generates a control current IDC. The control current IDC is used to control the strength of the pump light, and enables the bump light to be coupled on the output optical signal, so as to stabilize the optical power of the output optical signal, that is, to maintain the output optical power of the optical signals output on the main optical channel at a fixed level. An Alternating Current (AC) in the current signal partially enters a bandpass filter 108 with a central frequency of f1, in which f1 is a carrier frequency of the monitoring signal. The bandpass filter 108 merely permits the carrier of the monitoring signal to enter a detection control unit 109. The carrier of the monitoring signal is demodulated to obtain the monitoring signal, and the parameters such as input/output optical power and laser temperature are detected according to indication of the monitoring signal. Afterwards, a reply signal is formed and is modulated in a sinusoidal signal generated by an oscillation circuit 111. Then, the signal is output to an adjustable gain amplifier 107 from the detection control unit 109, in which the sinusoidal signal on which the reply signal is modulated is amplified by the adjustable gain amplifier 107, and an AC signal IAC is output to the LD 106. The AC signal IAC and the IDC are combined and then sent to the pump LD 106, so as to drive the pump LD to generate pump light with disturbance being the same as the AC signal IAC. An output optical signal enters the erbium doped fiber 101 from the coupler 102, and when the output optical signal is amplified with the pump light, a reply signal is modulated on the output optical signal through the disturbance of the pump light and is sent back to the terrestrial monitoring unit for detection.

Before the IAC and the IDC are combined, in order to adjust the AC signal IAC on which the reply signal is modulated, a part of the IDC is sent to an operational amplifier 110 and converted into a voltage signal. The voltage signal is used to control the gain of the adjustable gain amplifier 107, so that the amplitude value of the AC signal IAC changes with the IDC at a fixed proportion finally, thereby achieving the purpose of fixing the pilot tone modulation depth of the reply signal on the main optical channel.

FIG. 2 is a curve diagram of the strength of pump light and an output gain of the LD in the relay station in FIG. 1. As shown in FIG. 2, the relation of the output gain of the EDFA and the strength of the pump light output by the LD is expressed as a monotonic curve, and the slope of the monotonic curve decreases with the increase of the strength of the pump light. It can be seen that when the strength of the pump light increases, the disturbance on the pump light may cause a disturbance decreasing on the output light. If the input optical power input to the relay station has a severe jitter, the severe jitter responded on the pump light may not be represented on the output gain of the EDFA, so that it cannot be ensured that the pilot tone modulation depth of the scramble signal on the main optical channel is fixed.

SUMMARY OF THE INVENTION

Embodiments of the present invention provide a relay station and a method for adjusting output optical signals of the relay station, so as to fix a pilot tone modulation depth of a scramble signal on a main optical path.

A relay station provided in an embodiment of the present invention includes:

a detection control unit, configured to continuously output an AC signal on which a replay signal is modulated;

an output light stabilization unit, configured to extract a DC signal from a current signal, in which the current signal is obtained from partial output optical signals received by the relay station through photoelectric conversion; compare a current value of the DC signal with a first preset value, when the current value of the DC signal is greater than the first preset value, decrease a current value of a drive current, and when the current value of the DC signal is smaller than the first preset value, increase the current value of the drive current, in which the drive current is used to drive generation of pump light;

a reply stabilization unit, configured to extract a first AC signal from the current signal, in which the first AC signal is a signal output after the AC signal on which the replay signal is modulated is adjusted once; obtain the DC signal from the output light stabilization unit, and subtract a valley value from a peak value of the first AC signal to obtain a difference value, divide the difference value by the current value of the DC signal to obtain a first ratio, compare the first ratio with a second preset value, when the first ratio is greater than the second preset value, decrease a gain value, and when the first ratio is smaller than the second preset value, increase the gain value, in which the gain value is used to adjust an amplitude value of the AC signal on which the reply signal is modulated;

an adjustable gain amplification unit, configured to adjust the amplitude value of the received AC signal on which the reply signal is modulated according to the gain value, and output an adjusted second AC signal; and a pump light output unit, configured to drive the generation of the pump light after coupling the second AC signal and the adjusted drive signal, so as to adjust a strength of the output optical signal.

An embodiment of the present invention further provides a method for adjusting output optical signals of a relay station, where the method includes:

extracting a DC signal from a current signal, in which the current signal is obtained from partial output optical signals received by the relay station through photoelectric conversion;

comparing a current value of the DC signal with a first preset value, when the current value of the DC signal is greater than the first preset value, decreasing a current value of a drive current, and when the current value of the DC signal is smaller than the first preset value, increasing the current value of the drive current, in which the drive current is used to drive generation of pump light;

extracting a first AC signal from the current signal, in which the first AC signal is a signal output after an AC signal on which a reply signal is modulated once;

subtracting a valley value from a peak value of the first AC signal to obtain a difference value, dividing the difference value by the current value of the DC signal to obtain a first ratio, comparing the first ratio with a second preset value, when the first ratio is greater than the second preset value, decreasing a gain value, and when the first ratio is smaller than the second preset value, increasing the gain value, in which the gain value is used to adjust an amplitude value of the AC signal on which the reply signal is modulated;

according to the gain value, adjusting the amplitude value of the AC signal on which the reply signal is modulated, and outputting an adjusted second AC signal; and driving the generation of pump light after coupling the second AC signal and the adjusted drive signal, so as to adjust a strength of the output optical signal.

It can be known from the technical solutions above, in the relay station and the method for adjusting output optical signals of the relay station according to the embodiments of the present invention, by adjusting the output optical signals and the pilot tone modulation depth of the AC signal on which the replay signal is modulated, the reply signals which are modulated on the output optical signals are stably output, thereby achieving the purpose of fixing the pilot tone modulation depth.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative effects shall fall within the protection scope of the present invention.

Figure 1:
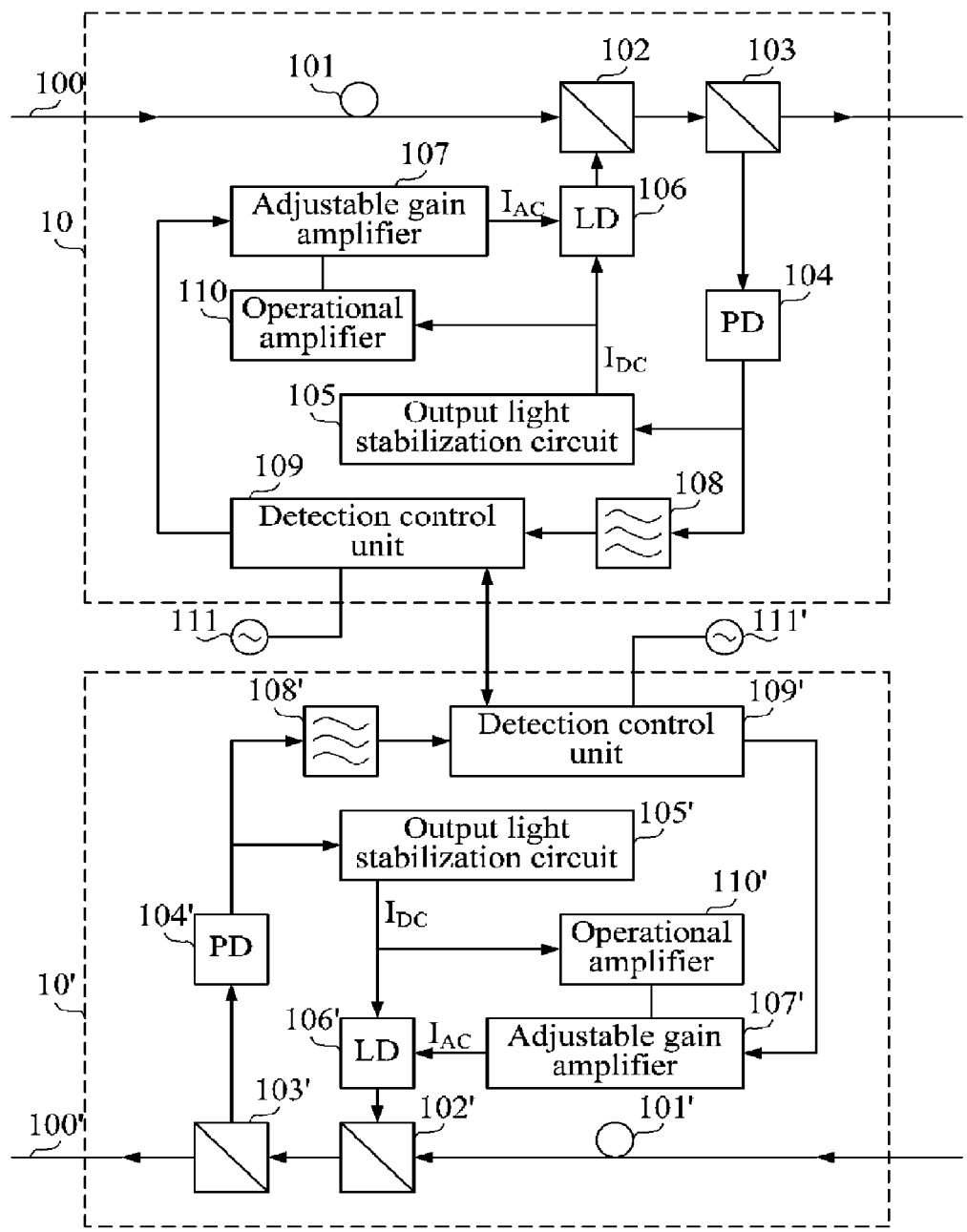
FIG. 1 is a schematic structural diagram of a relay station with a fixed pilot tone modulation depth in the prior art.
Figure 2:
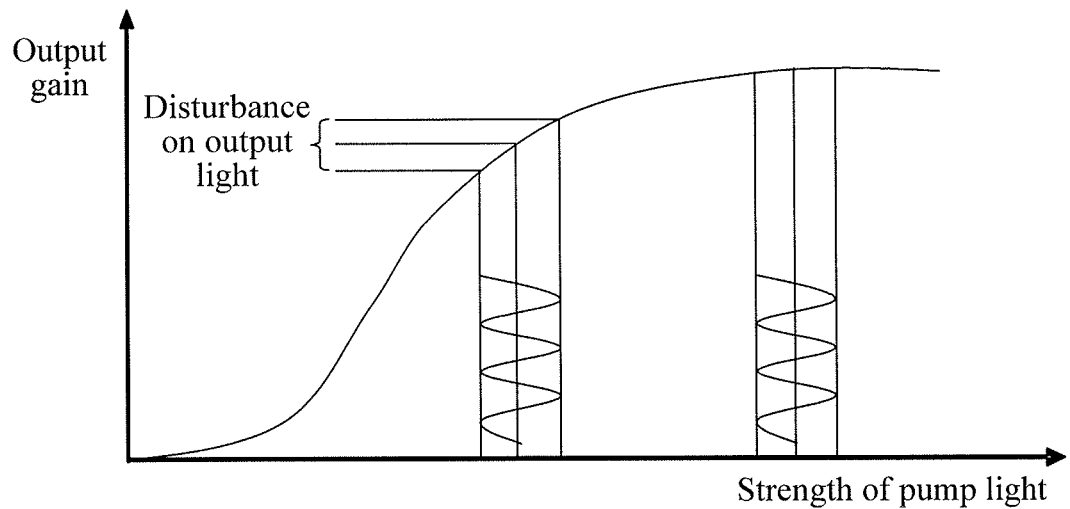
FIG. 2 is a curve diagram of strength of pump light and an output gain of an LD in the relay station in FIG. 1.
Figure 3:
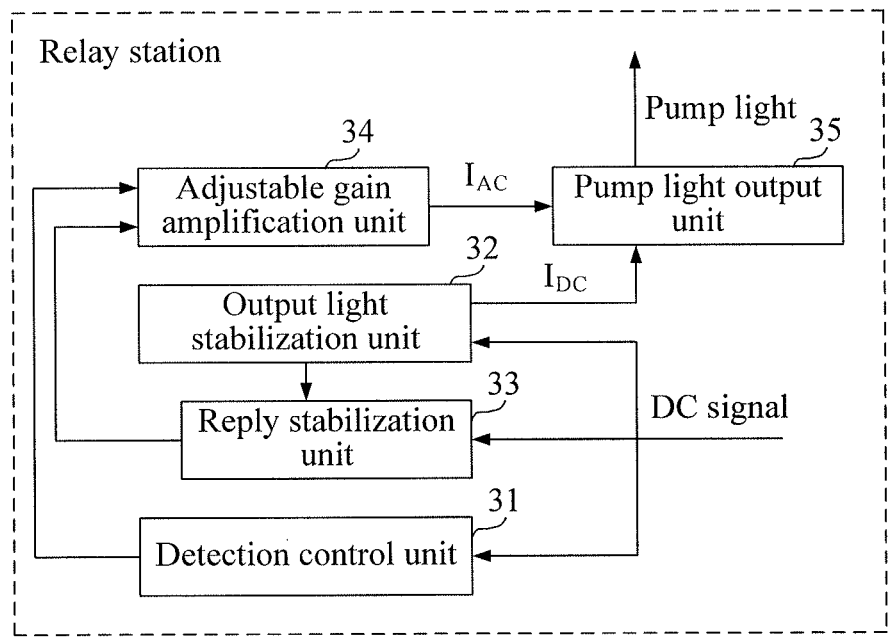
FIG. 3 is a schematic structural diagram of Embodiment 1 of a relay station according to the present invention.

FIG. 3 is a schematic structural diagram of Embodiment 1 of a relay station of the present invention. As shown in FIG. 3, the relay station includes a detection control unit 31, an output light stabilization unit 32, a reply stabilization unit 33, an adjustable gain amplification unit 34, and a pump light output unit 35. The detection control unit 31 is configured to continuously output an AC signal on which a reply signal is modulated, in which the reply signal includes various working parameters of the relay station, such as input/output optical power and working temperature. The output light stabilization unit 32 is configured to extract a DC signal from a current signal, in which the current signal is obtained from partial output optical signals received by the relay station through photoelectric conversion; compare a current value of the DC signal with a first preset value, when the current value of the DC signal is greater than the first preset value, decrease a current value of a drive current, and when the current value of the DC signal is smaller than the first preset value, increase the current value of the drive current, in which the drive current is used to drive generation of pump light. The relay stabilization unit 33 is configured to extract a first AC signal from the current signal, in which the first AC signal is a signal output after the AC signal on which the replay signal is modulated is adjusted once; obtain the DC signal from the output light stabilization unit, and subtract a valley value from a peak value of the first AC signal to obtain a difference value, divide the difference value by the current value of the DC signal to obtain a first ratio, compare the first ratio with a second preset value, when the first ratio is greater than the second preset value, decrease a gain value, and when the first ratio is smaller than the second preset value, increase the gain value, in which the gain value is used to adjust an amplitude value of the AC signal on which a reply signal is modulated. The adjustable gain amplification unit 34 is configured to adjust the amplitude value of the received AC signal on which the reply signal is modulated according to the gain value, and output an adjusted second AC signal on which the reply signal is modulated. The pump light output unit 35 is configured to drive the generation of the pump light after coupling the second AC signal and the adjusted drive signal, and carry the reply signal on the output optical signal through the pump light and adjust a strength of the output optical signal.

In the relay station according to this embodiment, by adjusting the output optical signal and the AC signal on which the replay signal is modulated through feedback, the pilot tone modulation depth of the AC signal on which the replay signal is modulated is fixed, so that the output optical signal which carries the reply signal can be stably output, thereby achieving the purpose of fixing the pilot tone modulation depth of the AC signal on which the reply signal is modulated.

In the embodiments above, the detection control unit 31 is further configured to extract an initial AC signal on which a monitoring signal is modulated from an initial current signal before continuously outputting the AC signal on which the reply signal is modulated, in which the initial current signal is obtained from the partial initial output optical signal received by the relay station through photoelectric conversion; demodulate the initial AC signal to obtain the monitoring signal, and generate a reply signal according to indication of the monitoring signal; and modulate the reply signal on the generated AC signal. Furthermore, the detection control unit 31 may not generate a reply signal according to the received monitoring signal but trigger generation of a reply signal and send the reply signal to terrestrial monitoring equipment according to the setting before continuously outputting the AC signal on which the reply signal is modulated.

Figure 4:
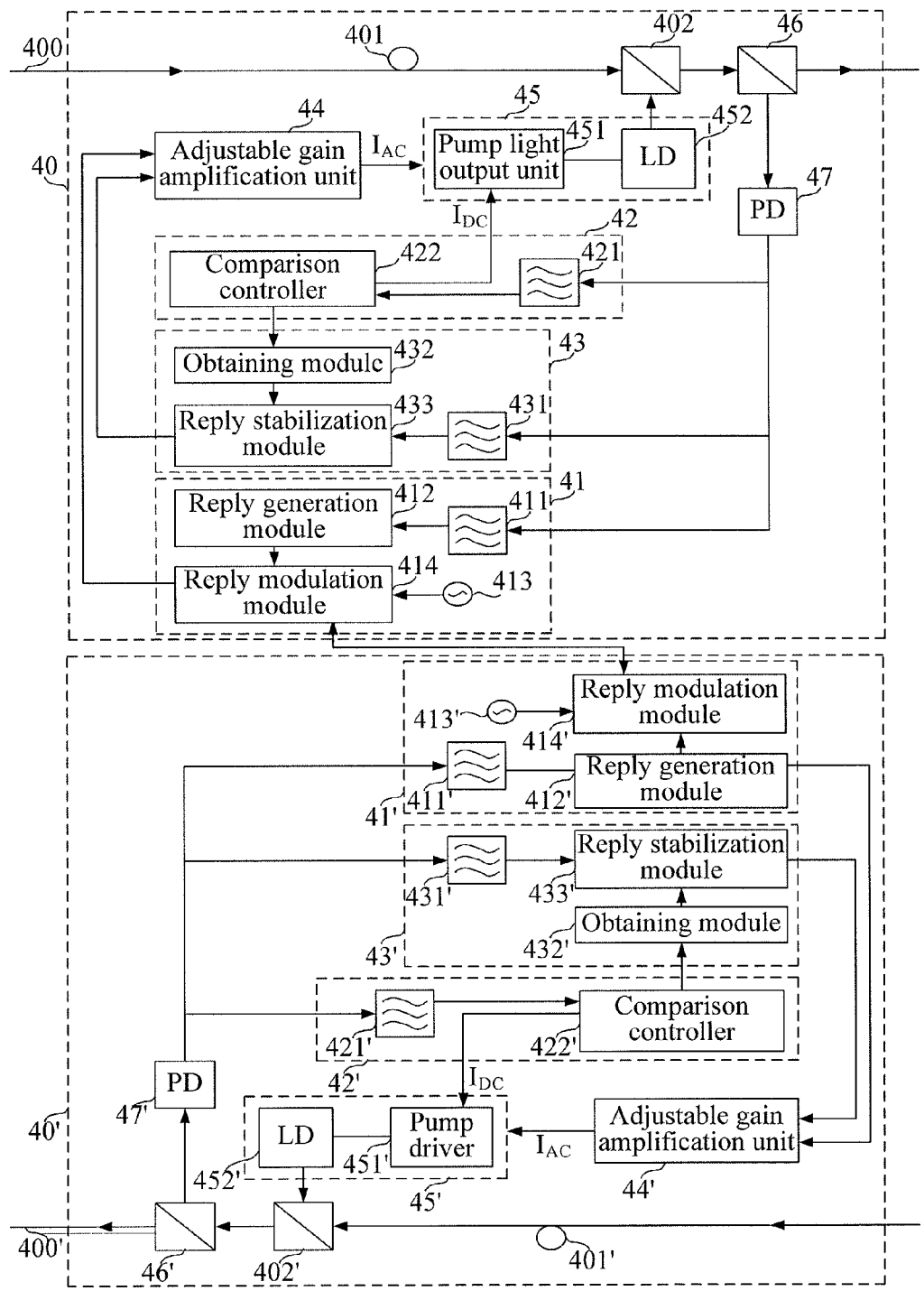
FIG. 4 is a schematic structural diagram of Embodiment 2 of the relay station according to the present invention.

FIG. 4 is a schematic structural diagram of Embodiment 2 of the relay station of the present invention. The detection control unit, the output light stabilization unit, the reply stabilization unit, the adjustable gain amplification unit, and the pump light output unit in the embodiment as shown in FIG. 3 are included and are numbered as a detection control unit 41, an output light stabilization unit 42, a reply stabilization unit 43, an adjustable gain amplification unit 44, and a pump light output unit 45, and the specific functions are the same as those described in the previous embodiment and will not be repeated herein. In the embodiment as shown in FIG. 4, the relay station further includes: an optical splitter 46, configured to split the initial output optical signal and the output optical signal into the partial initial output optical signal and the partial output optical signal; and a PD 47, configured to respectively convert the received partial initial output optical signal and the partial output optical signal into the initial current signal and the current signal.

The output light stabilization unit 42 may include: a lowpass filter 421, configured to extract a DC signal from a current signal; and a comparison controller 422, configured to compare a current value of the DC signal with the first preset value, when the current value of the DC signal is greater than the first preset value, decrease a current value of a drive current, and when the current value of the DC signal is smaller than the first preset value, increase the current value of the drive current, in which the drive current is used to drive generation of pump light.

The reply stabilization unit 43 may include: a first bandpass filter 431, configured to extract the first AC signal from the current signal; an obtaining module 432, configured to obtain the DC signal from the output light stabilization unit; a reply stabilization module 433, configured to subtract a valley value from a peak value of the first AC signal to obtain a difference value, divide the difference value by a current value of the DC signal to obtain a first ratio, compare the first ratio with a second preset value, when the first ratio is greater than the second preset value, decrease a gain value, and when the first ratio is smaller than the second preset value, increase the gain value, in which the gain value is used to adjust an amplitude value of the AC signal on which the reply signal is modulated.

The detection control unit 41 may include: a second bandpass filter 411, configured to extract an initial AC signal on which a monitoring signal is modulated from an initial current signal; a reply generation module 412, configured to demodulate the initial AC signal to obtain the monitoring signal, and generate a reply signal according to indication of the monitoring signal; an AC signal generation module 413, configured to generate continuous AC signals through oscillation; and a reply modulation module 414, configured to modulate the reply signal on the generated AC signal.

Hereinafter, according to the transmission of signal flow, adjustment of the output optical signal and the reply signal carried on the output optical signal by the relay station as shown in FIG. 4 is specifically described. The relay station as shown in FIG. 4 is divided into an uplink control part 40 and a downlink control part 40'.

In view of the uplink control part 40, an initial input optical signal that carries a monitoring signal enters an erbium doped fiber 401 from a transmission link 400, and an initial output optical signal that carries the monitoring signal is output by a wavelength division multiplexer 402. After passing through the optical splitter 46, most of the initial output optical signal that carries the monitoring signal is continuously transmitted on the transmission link, and the rest small part of the output optical signal enters the PD 47 and is converted into an initial current signal. An initial AC signal on which the monitoring signal is modulated on the initial current signal is partially input to the reply generation module 412 through bandpass filter of the second bandpass filter 411. The reply generation module 412 demodulates the initial AC signal to obtain the monitoring signal, completes detection of the parameters such as input/output optical power and laser temperature according to indication of the monitoring signal, and then forms a reply signal and modulates the reply signal on the AC signal generated by the AC signal generation module 413. The AC signal on which the reply signal is modulated is output to the adjustable gain amplification unit 44, if it is assumed that an initial gain value of the adjustable gain amplification unit 44 is 1, the AC signal on which the reply signal is modulated is still output by the adjustable gain amplification unit 44, as shown in IAC, and is output to a pump driver 451 in the pump light output unit 45. The initial DC signal in the initial current signal partially passes through the low-pass filter 421 in the output light stabilization unit 42 and is input to the comparison controller 422. The comparison controller 422 compares the current value of the initial DC signal with a first preset value preset in the comparison controller 422, when the current value of the initial DC signal is greater than the first preset value, decreases the current value of the drive current IDC, when the current value of the initial DC signal is smaller than the first preset value, increases the current value of the drive current IDC, and outputs the determined IDC to the pump driver 451. As for the adjustment of the drive current IDC, a mapping table of the current value of the DC signal and the drive current IDC is established in the comparison controller 422 for determination, or a step is set, when the current value of the DC signal is greater than the first preset value, the value of the drive current IDC is decreased by one step value, and when the current value of the DC signal is smaller than the first preset value, the value of the drive current IDC is increased by one step value.

Then, the pump driver 451 couples the input AC signal IAC on which the reply signal is modulated and drive current IDC and generates a drive current to drive the LD 452 to generate pump light with a disturbance. The output pump light is reflected into the erbium doped fiber 401 by the wavelength division multiplexer 402, the initial input optical signal is amplified, an amplified output optical signal is output, and the reply signal is carried on the output optical signal through the disturbance of the pump light.

After passing through the optical splitter 46, most of the initial output optical signal that carries the reply signal is continuously transmitted on the transmission link 400, and the rest small part of the output optical signal enters the PD 47 and is converted into a current signal. The DC signal in the current signal partially passes through the low-pass filter 421 in the output light stabilization unit 42 and is input to the comparison controller 422. The comparison controller 422 compares the current value of the DC signal with a first preset value preset in the comparison controller 422, when the current value of the DC signal is greater than the first preset value, decreases the current value of the drive current IDC, when the current value of the DC signal is smaller than the first preset value, increases the current value of the drive current IDC, and outputs the determined IDC to the pump driver 451. A first AC signal which carries the reply signal in the current signal partially passes through the first bandpass filter 431 in the reply stabilization unit 43 and enters the reply stabilization module 433 in the reply stabilization unit 43. The obtaining module 432 obtains the DC signal extracted by the output light stabilization unit 42 from the output light stabilization unit 42. The obtained DC signal is also input to the reply stabilization module 433. The reply stabilization module 433 subtracts the valley value from the peak value of the first AC signal to obtain a difference value, and divides the difference value by the current value of the DC signal to obtain a first ratio, compares the first ratio with a second preset value preset in the reply stabilization module 433, when the first ratio is greater than the second preset value, decreases the gain value of the adjustable gain amplification unit 44 through control, and when the first ratio is smaller than the second preset value, increases the gain value of the adjustable gain amplification unit 44 through control, in which the gain value is used to adjust the amplitude value of the AC signal on which the reply signal is modulated. Meanwhile, the detection control unit 41 continuously sends the generated AC signal on which the reply signal is modulated to the adjustable gain amplification unit 44, and the adjustable gain amplification unit 44 adjusts the amplitude value of the AC signal on which the reply signal is modulated through the adjusted gain value, and then outputs an adjusted second AC signal on which the reply signal is modulated, as shown in IAC.

Then, the pump driver 451 couples the input second AC signal IAC on which the reply signal is modulated and the drive current IDC after adjusting again, and generates a drive current to drive the LD 452 to generate pump light with a disturbance. The output pump light is reflected into the erbium doped fiber 401 by the wavelength division multiplexer 402, the output optical signal is amplified, an amplified output optical signal is output, and the reply signal is carried on the output optical signal after amplification through the disturbance of the pump light.

Adjustment of the procedure is performed continuously, till the drive current IDC and the gain value of the adjustable gain amplification unit 44 enable the output optical signal after final adjustment to be stable and the pilot tone modulation depth of the reply signal carried on the output optical signal to be fixed.

In the relay station according to this embodiment, by continuously feeding back the reply signal and the output optical signal, the drive current IDC and the gain value of the adjustable gain amplification unit 44 are adjusted, and the finally adjusted drive current IDC and the gain value of the adjustable gain amplification unit 44 enable the reply signal carried on the output optical signal to be stably output, thereby achieving the purpose of fixing the pilot tone modulation depth.

Figure 5:
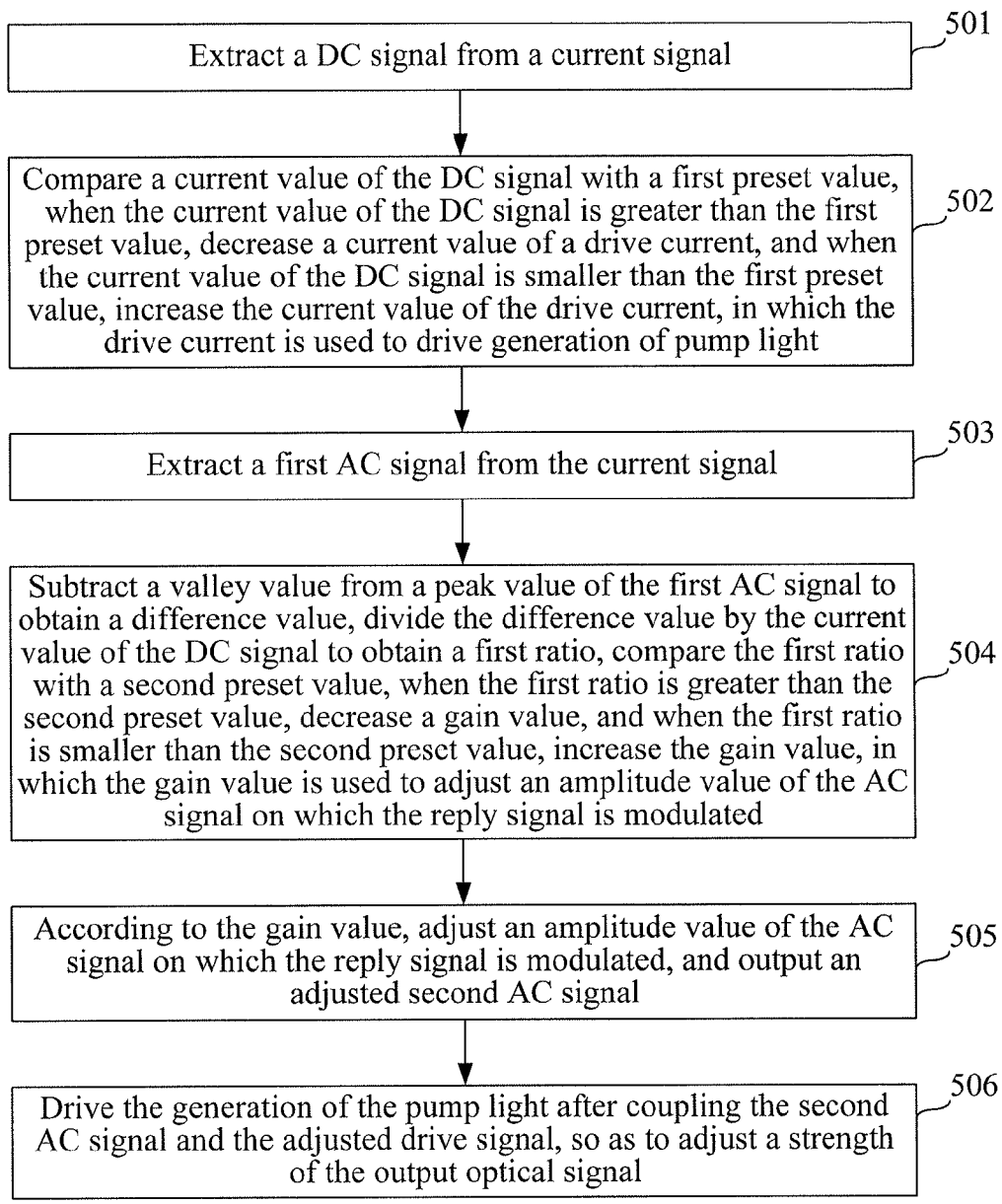
FIG. 5 is a schematic flow chart of an embodiment of a method for adjusting output optical signals of a relay station according to the present invention.

FIG. 5 is a schematic flow chart of Embodiment 1 of a method for adjusting output optical signals of a relay station of the present invention. As shown in FIG. 5, the method includes the following steps.

Step 501: Extract a DC signal from a current signal, in which the current signal is obtained from partial output optical signals received by the relay station through photoelectric conversion.

Step 502: Compare a current value of the DC signal with a first preset value, when the current value of the DC signal is greater than the first preset value, decrease a current value of a drive current, and when the current value of the DC signal is smaller than the first preset value, increase the current value of the drive current, in which the drive current is used to drive generation of pump light.

Step 503: Extract a first AC signal from the current signal, in which the first AC signal is a signal output after an AC signal on which a reply signal is modulated once.

Step 504: Subtract a valley value from a peak value of the first AC signal to obtain a difference value, divide the difference value by the current value of the DC signal to obtain a first ratio, compare the first ratio with a second preset value, when the first ratio is greater than the second preset value, decrease a gain value, and when the first ratio is smaller than the second preset value, increase the gain value, in which the gain value is used to adjust an amplitude value of the AC signal on which the reply signal is modulated.

Step 505: According to the gain value, adjust an amplitude value of the AC signal on which the reply signal is modulated, and output an adjusted second AC signal.

Step 506: Drive the generation of the pump light after coupling the second AC signal and the adjusted drive signal, so as to adjust the strength of the output optical signal.

As for the specific implementation of the method for adjusting output optical signals of the relay station, reference may be made to the specific description in the embodiment of the relay station, which will not be repeated herein.

In the method for adjusting output optical signals of the relay station according to this embodiment, by adjusting the output optical signal and the AC signal on which the replay signal is modulated through feedback, the pilot tone modulation depth of the AC signal on which the replay signal is modulated is fixed, so that the output optical signal which carries the reply signal can be stably output, thereby achieving the purpose of fixing the pilot tone modulation depth of the AC signal on which the reply signal is modulated.

According to the embodiment of the method for adjusting output optical signals of the relay station, the step of modulating the reply signal on the AC signal further includes:

extracting an initial AC signal on which a monitoring signal is modulated from an initial current signal, in which the initial current signal is obtained from partial initial output optical signal received by the relay station through photoelectric conversion;

demodulating the initial AC signal to obtain the monitoring signal, and generating a reply signal according to indication of the monitoring signal; and modulating the reply signal on the generated AC signal.

Furthermore, before step 501, the method further includes:

Step 500*a*: Split the initial output optical signal and the output optical signal into the partial initial output optical signal and the partial output optical signal; and Step 500*b*: Convert the received partial initial output optical signal and the partial output optical signal into the initial current signal and the current signal.

As for the specific implementation of the method for adjusting output optical signals of the relay station, reference may be made to the specific description in the embodiment of the relay station, which will not be repeated herein.

In the relay station according to this embodiment, by continuously feeding back the reply signal and the output optical signal, the drive current and the gain value are adjusted, and the finally adjusted drive current and the gain value enable the reply signal carried on the output optical signal to be stably output, thereby achieving the purpose of fixing the pilot tone modulation depth.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A relay station, comprising:
   a detection control unit, configured to continuously output an Alternating Current (AC) signal on which a replay signal is modulated;
   an output light stabilization unit, configured to extract a Direct Current (DC) signal from a current signal, wherein the current signal is obtained from partial output optical signals received by the relay station through photoelectric conversion; compare a current value of the DC signal with a first preset value, when the current value of the DC signal is greater than the first preset value, decrease a current value of a drive current, and when the current value of the DC signal is smaller than the first preset value, increase the current value of the drive current, wherein the drive current is used to drive generation of pump light;
   a reply stabilization unit, configured to extract a first AC signal from the current signal, wherein the first AC signal is a signal output after the AC signal on which the replay signal is modulated is adjusted once; obtain the DC signal from the output light stabilization unit, and subtract a valley value from a peak value of the first AC signal to obtain a difference value, divide the difference value by the current value of the DC signal to obtain a first ratio, compare the first ratio with a second preset value, when the first ratio is greater than the second preset value, decrease a gain value, and when the first ratio is smaller than the second preset value, increase the gain value, wherein the gain value is used to adjust an amplitude value of the AC signal on which the reply signal is modulated;
   an adjustable gain amplification unit, configured to adjust the amplitude value of the received AC signal on which the reply signal is modulated according to the gain value, and output an adjusted second AC signal on which the reply signal is modulated; and
   a pump light output unit, configured to drive the generation of the pump light after coupling the second AC signal and the adjusted drive current, and carry the reply signal on the output optical signal through the pump light and adjust a strength of the output optical signal.

2. The relay station according to claim 1, wherein
   the detection control unit is further configured to extract an initial AC signal on which a monitoring signal is modulated from an initial current signal before continuously outputting the AC signal on which the reply signal is modulated, and the initial current signal is obtained from partial initial output optical signals received by the relay station through photoelectric conversion; demodulate the initial AC signal to obtain the monitoring signal, and generate a reply signal according to indication of the monitoring signal; and modulate the reply signal on the generated AC signal.

3. The relay station according to claim 2, further comprising:
   an optical splitter, configured to split the initial output optical signal and the output optical signal into the partial initial output optical signal and the partial output optical signal; and a photodiode (PD), configured to convert the received partial initial output optical signal and the partial output optical signal into the initial current signal and the current signal.

4. The relay station according to claim 1, wherein the output light stabilization unit comprises:
   a low-pass filter, configured to extract the DC signal from the current signal; and
   a comparison controller, configured to compare the current value of the DC signal with the first preset value, when the current value of the DC signal is greater than the first preset value, decrease the current value of the drive current, and when the current value of the DC signal is smaller than the first preset value, increase the current value of the drive current, wherein the drive current is used to drive the generation of pump light.

5. The relay station according to claim 2, wherein the output light stabilization unit comprises:
   a low-pass filter, configured to extract the DC signal from the current signal; and
   a comparison controller, configured to compare the current value of the DC signal with the first preset value, when the current value of the DC signal is greater than the first preset value, decrease the current value of the drive current, and when the current value of the DC signal is smaller than the first preset value, increase the current value of the drive current, wherein the drive current is used to drive the generation of pump light.

6. The relay station according to claim 3, wherein the output light stabilization unit comprises:
   a low-pass filter, configured to extract the DC signal from the current signal; and
   a comparison controller, configured to compare the current value of the DC signal with the first preset value, when the current value of the DC signal is greater than the first preset value, decrease the current value of the drive current, and when the current value of the DC signal is smaller than the first preset value, increase the current value of the drive current, wherein the drive current is used to drive the generation of pump light.

7. The relay station according to claim 1, wherein the reply stabilization unit comprises:
   a first bandpass filter, configured to extract the first AC signal from the current signal;
   an obtaining module, configured to obtain the DC signal from the output light stabilization unit; and
   a reply stabilization module, configured to subtract the valley value from the peak value of the first AC signal to obtain the difference value, divide the difference value by the current value of the DC signal to obtain the first ratio, compare the first ratio with the second preset value, when the first ratio is greater than the second preset value, decrease the gain value, and when the first ratio is smaller than the second preset value, increase the gain value, wherein the gain value is used to adjust the amplitude value of the AC signal on which the reply signal is modulated.

8. The relay station according to claim 2, wherein the reply stabilization unit comprises:
   a first bandpass filter, configured to extract the first AC signal from the current signal;
   an obtaining module, configured to obtain the DC signal from the output light stabilization unit; and
   a reply stabilization module, configured to subtract the valley value from the peak value of the first AC signal to obtain the difference value, divide the difference value by the current value of the DC signal to obtain the first ratio, compare the first ratio with the second preset value, when the first ratio is greater than the second preset value, decrease the gain value, and when the first ratio is smaller than the second preset value, increase the gain value, wherein the gain value is used to adjust the amplitude value of the AC signal on which the reply signal is modulated.

9. The relay station according to claim 3, wherein the reply stabilization unit comprises:
   a first bandpass filter, configured to extract the first AC signal from the current signal;
   an obtaining module, configured to obtain the DC signal from the output light stabilization unit; and
   a reply stabilization module, configured to subtract the valley value from the peak value of the first AC signal to obtain the difference value, divide the difference value by the current value of the DC signal to obtain the first ratio, compare the first ratio with the second preset value, when the first ratio is greater than the second preset value, decrease the gain value, and when the first ratio is smaller than the second preset value, increase the gain value, wherein the gain value is used to adjust the amplitude value of the AC signal on which the reply signal is modulated.

10. The relay station according to claim 2, wherein the detection control unit comprises:
    a second bandpass filter, configured to extract the initial AC signal on which the monitoring signal is modulated from the initial current signal;
    a reply generation module, configured to demodulate the initial AC signal to obtain the monitoring signal, and generate the reply signal according to the indication of the monitoring signal;
    an AC signal generation module, configured to generate continuous AC signals through oscillation; and
    a reply modulation module, configured to modulate the reply signal on the generated AC signal.

11. The relay station according to claim 3, wherein the detection control unit comprises:
    a second bandpass filter, configured to extract the initial AC signal on which the monitoring signal is modulated from the initial current signal;
    a reply generation module, configured to demodulate the initial AC signal to obtain the monitoring signal, and generate the reply signal according to the indication of the monitoring signal;
    an AC signal generation module, configured to generate continuous AC signals through oscillation; and
    a reply modulation module, configured to modulate the reply signal on the generated AC signal.

12. A method for adjusting output optical signals of a relay station, comprising:
    extracting a Direct Current (DC) signal from a current signal, wherein the current signal is obtained from partial output optical signals received by the relay station through photoelectric conversion;
    comparing a current value of the DC signal with a first preset value, when the current value of the DC signal is greater than the first preset value, decreasing a current value of a drive current, and when the current value of the DC signal is smaller than the first preset value, increasing the current value of the drive current, wherein the drive current is used to drive generation of pump light;

extracting a first Alternating Current (AC) signal from the current signal, wherein the first AC signal is a signal output after an AC signal on which a reply signal is modulated once;

subtracting a valley value from a peak value of the first AC signal to obtain a difference value, dividing the difference value by the current value of the DC signal to obtain a first ratio, comparing the first ratio with a second preset value, when the first ratio is greater than the second preset value, decreasing a gain value, and when the first ratio is smaller than the second preset value, increasing the gain value, wherein the gain value is used to adjust an amplitude value of the AC signal on which the reply signal is modulated;

according to the gain value, adjusting the amplitude value of the AC signal on which the reply signal is modulated, and outputting an adjusted second AC signal; and driving the generation of pump light after coupling the second AC signal and the adjusted drive signal, so as to adjust an strength of the output optical signal.

13. The method for adjusting output optical signals of a relay station according to claim 12, wherein the method further comprises: modulating the reply signal on the AC signal, wherein the modulating the reply signal on the AC signal specifically comprises:

extracting an initial AC signal on which a monitoring signal is modulated from an initial current signal, wherein the initial current signal is obtained from partial initial output optical signal received by the relay station through photoelectric conversion;

demodulating the initial AC signal to obtain the monitoring signal, and generating a reply signal according to indication of the monitoring signal; and modulating the reply signal on the generated AC signal.

14. The method for adjusting output optical signals of a relay station according to claim 12, wherein the method further comprises:

splitting the initial output optical signal and the output optical signal into the partial initial output optical signal and the partial output optical signal; and converting the received partial initial output optical signal and the partial output optical signal into the initial current signal and the current signal.

15. The method for adjusting output optical signals of a relay station according to claim 13, wherein the method further comprises:

splitting the initial output optical signal and the output optical signal into the partial initial output optical signal and the partial output optical signal; and converting the received partial initial output optical signal and the partial output optical signal into the initial current signal and the current signal.

* * * * *